United States Patent
Smyros et al.

(10) Patent No.: US 9,495,352 B1
(45) Date of Patent: Nov. 15, 2016

(54) NATURAL LANGUAGE DETERMINER TO IDENTIFY FUNCTIONS OF A DEVICE EQUAL TO A USER MANUAL

(71) Applicants: Athena Ann Smyros, Gunter, TX (US); Constantine John Smyros, Gunter, TX (US)

(72) Inventors: Athena Ann Smyros, Gunter, TX (US); Constantine John Smyros, Gunter, TX (US)

( * ) Notice: Subject to any disclaimer, the term of this patent is extended or adjusted under 35 U.S.C. 154(b) by 0 days.

(21) Appl. No.: 13/625,784

(22) Filed: Sep. 24, 2012

Related U.S. Application Data

(60) Provisional application No. 61/538,821, filed on Sep. 24, 2011.

(51) Int. Cl.
*G06F 17/27* (2006.01)
*G06F 17/28* (2006.01)

(52) U.S. Cl.
CPC ....... *G06F 17/2705* (2013.01); *G06F 17/2785* (2013.01); *G06F 17/289* (2013.01)

(58) Field of Classification Search
CPC ............. G06F 17/2785; G06F 17/289; G06F 17/2775
USPC .......................................................... 704/9
See application file for complete search history.

(56) References Cited

U.S. PATENT DOCUMENTS

| | | | |
|---|---|---|---|
| 5,873,056 A | 2/1999 | Liddy et al. | |
| 6,112,201 A | 8/2000 | Wical | |
| 6,665,661 B1 | 12/2003 | Crow et al. | |
| 7,398,201 B2 * | 7/2008 | Marchisio et al. | 704/9 |
| 8,589,413 B1 | 11/2013 | Mohan et al. | |
| 2005/0010555 A1 | 1/2005 | Gallivan | |
| 2006/0149720 A1 | 7/2006 | Dehlinger | |
| 2007/0010990 A1 | 1/2007 | Woo | |
| 2007/0130112 A1 * | 6/2007 | Lin | 707/2 |
| 2007/0282598 A1 | 12/2007 | Waelti | |
| 2008/0147632 A1 * | 6/2008 | Couch et al. | 707/5 |
| 2008/0228467 A1 * | 9/2008 | Womack et al. | 704/9 |
| 2008/0313167 A1 * | 12/2008 | Anderson | 707/5 |
| 2009/0328226 A1 | 12/2009 | Bradford | |
| 2010/0281030 A1 | 11/2010 | Kusumura | |
| 2011/0093257 A1 | 4/2011 | Shpigel | |
| 2011/0231773 A1 | 9/2011 | Dhara | |
| 2011/0246181 A1 * | 10/2011 | Liang | G06F 17/2775 704/9 |

* cited by examiner

*Primary Examiner* — Farzad Kazeminezhad
(74) *Attorney, Agent, or Firm* — Slater Matsil, LLP

(57) ABSTRACT

Embodiments described herein of the natural language determiner (NLD) illustrate the ability to determine, at runtime, the conversion of natural language text into a computer-usable form. The natural language determiner's function is used to identify all functions of a device equal to a user manual for the device and displays at least one function of the device equal to the user manual for the device.

5 Claims, 2 Drawing Sheets

NATURAL LANGUAGE DETERMINER TO IDENTIFY FUNCTIONS OF A DEVICE EQUAL TO A USER MANUAL

RELATED APPLICATIONS

This application claims priority from Provisional Application No. 61/538,821, entitled "NLD and ADS with Bifurcated Index", filed 24 Sep. 2011, the disclosure of which is hereby incorporated herein by reference.

TECHNICAL FIELD

The present invention relates in general to information repository management and in particular to a natural language determiner for use in any electronic application that is associated with the processing of natural language.

BACKGROUND

The current state-of-the-art of natural language processors use tree-adjoining grammars and other types of computationally-intensive processes that introduce errors because of their underlying theory. Also, current natural language processors are not suitable for small footprints because they require many libraries and other reference files. In addition, current natural language processors also require a large amount of computational power, which prevents current natural language processors from being cost-effective for small businesses having the need to use natural language products.

SUMMARY

Embodiments of the natural language determiner (NLD) described herein illustrate the ability to determine, at runtime, the conversion of natural language text into a computer-usable form.

One embodiment of a NLD is a computer program product having a computer readable medium having computer program logic recorded thereon for determining, at runtime, the various data stores that can be formed without human intervention for any text scope, the computer program product comprising: code for receiving text data; code for parsing text data into TUs; code for scanning for verb formations; code for scanning for starting FWs; code for forming bucket; and code for assigning each bucket to an object container.

BRIEF DESCRIPTION OF THE DRAWINGS

The accompanying drawings are incorporated in and are a part of this specification. Understanding that these drawings illustrate only typical embodiments of the invention and are not therefore to be considered to be limiting of its scope, the invention will be described and explained more fully through the use of these accompanying drawings in which.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention. Note that the items within the figures are not necessarily drawn to scale.

A natural language determiner (NLD), according to the embodiments described herein, is designed to evaluate language effectively and efficiently on a small system footprint so that it can form the basis for any type of natural language input and output processing, even on mobile or embedded devices, in addition to a standard computer, or larger enterprise server.

A NLD uses as an input, data that is in any natural language form, and produces an output that comprises an object container with a set of buckets that define how words are being used in the input within the grammar rules of a given language. A NLD system uses a process that is comprised of four basic parts: receiving the input data, building buckets, performing refinements, and constructing an object container to house the buckets. Note that the input data may be comprised of text data. The input data may be comprised of speech data that is converted to text data by an optional speech to text converter. The input data may be optical data that is converted to text data by an optional image to text converter. Depending on the type and length of inputs, the object containers can be grouped to match the sentences that make up a much longer document. In addition, the buckets themselves can be placed in any order to facilitate any type of analysis that is required after the grammar has been determined.

Figure 1:
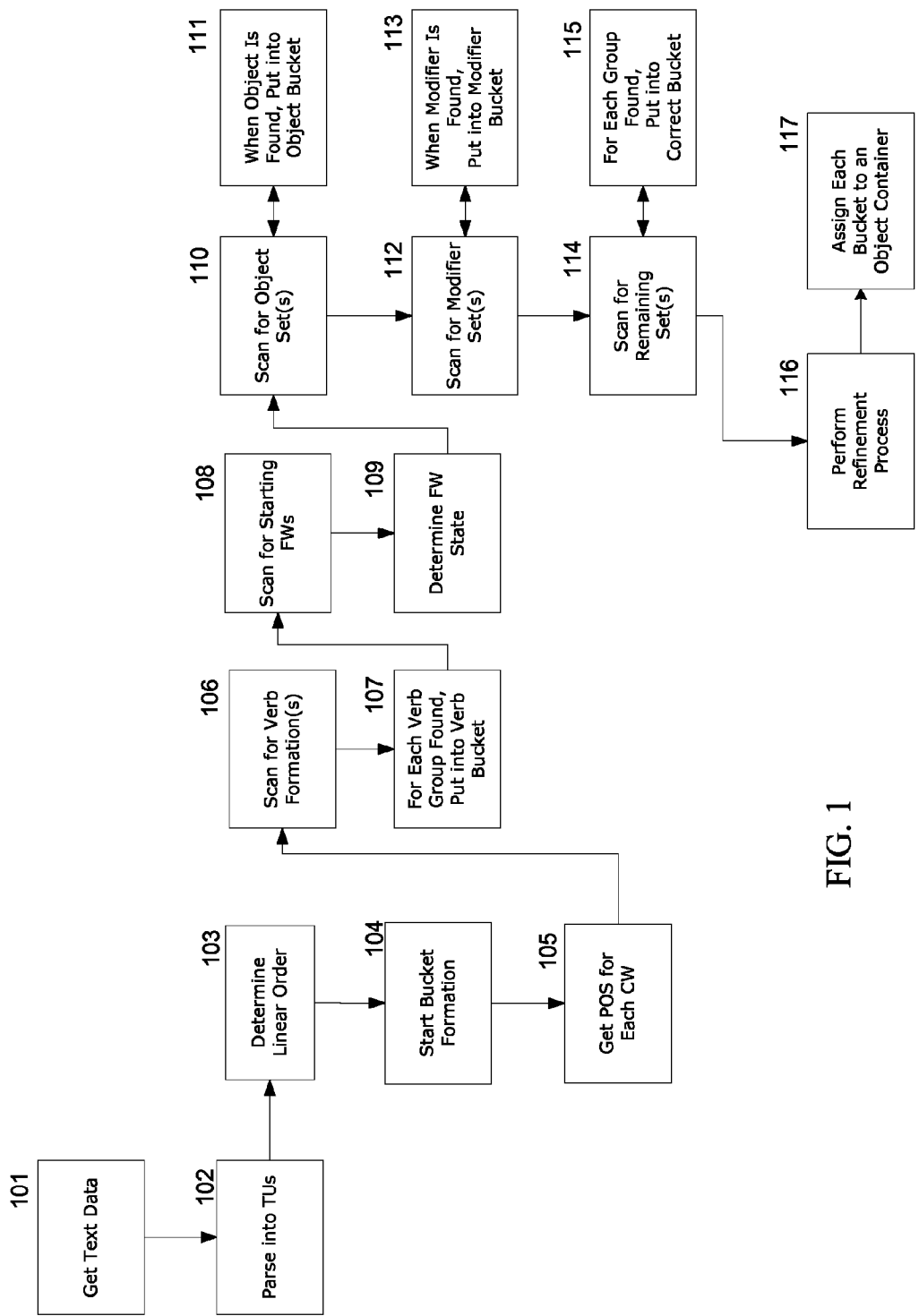
FIG. 1 depicts an example of a flowchart for one embodiment of a natural language determiner (NLD) according to aspects of the invention.

FIG. 1 depicts an exemplary process of a NLD. In FIG. 1, the box Get Text Input 101 describes the process of taking unparsed text from any source. The text data can be in any type of format, from structured data sources such as databases or tables to semi-structured data that contains XML tags to unstructured data with little or no formatting such as a text file. Text information may also come from other file formats that contain optical, video or audio information, where the text is extracted by an appropriate converter for use within this system. The text should be maintained in presentation or appearance order, i.e. the order originally expressed in the input or the order in which the text is presented to the user. This is because the position of each word or character in the input is used in grammatical analysis.

Thus, in box 102, the process requires that the set of characters for a language are known and that the text is in appearance order. Once these two conditions have been met, then the text can be parsed. Several methods can be used to parse words, but some conditions should be kept so that an effective parse occurs. One method is to parse the text into term units or TUs. Term units make a distinction between the regular alphabet in the language and the symbols that exist in the language, as well as the punctuation in the language. Normally, a symbol will expand to one or more words, so the parsing should indicate those alphabet members that form words that are disconnected from the individual meaning of the characters, except for the use of the acronyms and/or abbreviations. Note that this statement is true for English; other languages may have a parsing routine where such characters in the language have a set of definitions. In addition, the term units also distinguish between the set of functional words and the set of content words; this makes other grammar functions more efficient. Term units and term unit parsing are further described in U.S. Pat. No. 7,882,143, entitled SYSTEMS AND METHODS FOR INDEXING INFORMATION FOR A SEARCH ENGINE, issued on 1 Feb. 2011 to Smyros et al., which is hereby incorporated herein by reference in its entirety. Note that term unit parsing is by way of example only as other parsing methods could be used.

As mentioned, any parsing algorithm resolves the linear order 103 of the input, which allows the text to be analyzed. At this point in the processing, all data in the file, document, or message should be available to the system. In general, the way in which the text is read is based on the word order and other document forms, such as paragraph, columnar text, tables, and other such organizational indicators within the document and text. Normally, English and any other natural language is going to require terms in a specific linear order, such that the order is related to meaning. However, some document forms do not allow a simple linear order because of the changes in speakers and users. Such documents may be found on a blog site or a message site, where there are other ways in which the groups of users are aggregated and therefore can be analyzed.

In social media files, the analysis of grammar may be done on a per-user or per-speaker basis, and may also follow threads or topics. Any of these variations may change the linear order of the original input to the NLP system. Any such ordering will work so long as within the user designation, for example, the language's word order is preserved so that the sentences that comprise the user's words are in the readable order for a given language. The final output of the parsing is to have the terms in their correct order, with symbols, punctuation, and other data distinguishable within the text string. Also, the functional words (such as a preposition which do not refer to a specific object or action) and content words (such as a noun which refer to a specific object) are discernible. This data will be used to determine if a TU should be used as part of a grammar component. A grammar component is any way to divide the functions of the elements of a language's grammar. For instance, a grammar component in English may be a modifier or may be an adjective, depending on the implementation. Some TUs, such as acronyms or abbreviations, are related to a regularly-formed TU via its spelled-out form. A spelled-out form refers to the set of words that comprise the acronym that can be mapped to one or more grammar components, depending on the number of words. This grammar component or entity is referred to as a bucket type, and maps any language constituent to the bucket 104.

A language constituent is a word that contains meaning within the confines of a specific language. For instance, an individual word or symbol in English will generally map to a single bucket, regardless of the type of word being used, such as a content word (CW) or a functional word (FW). This is because the function of the word within the larger construct of a sentence within the input has a single purpose, such as a noun modifying another noun. Numbers also map to a bucket type(s), whether in spelled out or in numeric form. Depending on the implementation, punctuation may not have to directly map to a bucket type(s), but it can determine the starting or ending point of a bucket. In other cases, punctuation maps to a bucket type(s). The bucket instance (or bucket) is comprised of a set of TUs that have a common purpose within the input. The bucket(s) is formed generally in appearance order; it is possible for some implementations to want to modify this to suit a search or other retrieval requirement. It is still important that the original order is preserved if any excerpts, most relevant parts, or other snippets of a document are required.

Bucket formation then enters a second phase, which is the parts of speech (POS) determination 105. Even though the general conditions for bucket formation are met, the CWs are mapped to a set of POS possibilities. These are generally done by the use of a lookup table, which maps each CW in the input known to the range of POSs it can support. Depending on the language, some POS may have associated rules such that some words cannot contain one POS when another POS is present. Note that the POS only represents the possibilities according to the lookup table, such as a dictionary source, and not the actual function of the TU within the document.

At this point, it is not possible to scan documents from the input for the presence of individual buckets. The number of bucket types shown as an example is for English and may range based on implementation. If a general-purpose system is required, the number of bucket types is based on the general functionality and may range between 1 and 8 bucket types. A bucket is an individual instance of a bucket type and occurs each time the function representing the bucket is found in the input. In English, the range is between 1 and 8 bucket types, with 4 being useful. Other bucket types may be formed for other languages that have different uses of POS. In some implementations, the ordering of the buckets may be done based on the proposed purpose, such as performing verb searches. In other cases, it may be done based on a general ordering of the language.

In one embodiment, the first formation scanned for is the verb bucket formation 106. This formation contains only verb members, and may contain as many verbs as necessary to form a tense, mood, or other verb construct in the language. In English, there is a typically a maximum of four verbs that form a tense. For each verb found by scanning the document, from beginning to end, for most implementations, determine if a verb tense exists or if a participle use exists. This is done by converting the tense and other verb forms into a pattern so that they can be found. In the excerpt: "the dog has been jumping over the fence", the verb pattern is equal to "present tense of to have"+"been"+"present participle" or "has+been+jumping", which represents the present perfect progressive tense in English. The instance of the verb bucket is then equal to the phrase "has been jumping".

Once all verbs that comprise a verb tense are found, then they are put into a verb bucket 107. There are as many verb buckets as there are verb forms detected by the system as used in the document or input. In some cases, an adverb may be inserted between two verbs that without the adverb the verbs form a complete verb phrase; then these should be marked as adverbs and stored for later processing.

Once the verb bucket instances are all found, then any other buckets required by the implementation may be populated. Thus, other buckets may not be needed, especially when only verbs are the object of analysis, such as looking for actions to support the functionality of a single device. For example, if the user needs a display of all the functions of a device and the repository is equal to the user manual for the device and the language is English, then these types of buckets may be useful to identify the functions that are possible.

For example, if more in depth analysis is required of a document, such that the relations of objects to one another and to modifiers are important, such as when the sentiment of a product is being measured, then FWs may be scanned and mapped to a functional word bucket type, such as a modifier or a pronoun bucket type. In this example, the starting FWs 108 scan process is performed next. This process examines the location of all the FWs in the document, so the scan should begin at the beginning of the document, and can skip any TUs that are not FWs. The list of FWs is generally based on the POS, so they serve as the basis for the scan; the list can either be compared or the FW data can already be encapsulated in the parsed form of a TU, such as a Windex value as in the above referenced U.S. Pat. No. 7,882,143. A Windex value is a representation of a TU based on its value as an FW or CW or any other grammar component division. Once an FW has been found, then it can be placed in the modifier bucket instance. The FW may also have a state associated with it 109. There are a variety of states that can be assigned to an FW. For example, a dependent state of an FW is considered part of a modifier bucket type; while an independent state of an FW is not generally considered part of a modifier bucket type for most languages. The actual determination of this varies based on language.

In languages such as English, an input may contain terms that might also map to another bucket type based on its actual function in the input, such as verbals, which are the set of verbs that behave like a noun. In the above example, "the dog has been jumping over the fence", the use of the present participle belongs to the verb bucket instance for that input. In the example: The jumping dog is bothering his owner", the same present participle will map to a different bucket type because it has a different function within the input; in this case it is a gerund acting as an adjective or modifier.

For many implementations, object scan 110 is performed. The object set is reserved for those terms that describe an actual object in a language. Normally these terms are one or two words (as in a compound noun). In order to determine if a TU can map to an object set, the independent/dependent state is considered in many languages. If such an object is found, all terms that comprise the object are put into an object bucket instance 111, and belong to the object bucket type. This bucket type has several uses, such as for information retrieval and other analysis. In some cases, this bucket type may not be required as for verb searching implementations.

For the remaining TUs that do not already map to a bucket type, they should be examined to see if they map to a modifier bucket type 112, especially for many information retrieval and analysis functions. Depending on the language, various POSs may map to the modifier bucket type. These may also be based on what functional values they perform within the sentence, and if they can map to another bucket type, such as an object bucket type. Also, as in English, a linking verb may have been in a verb bucket instance, and what follows the linking verb may also be added to the modifier bucket instance for that input. Also, as in English, adverbs can modify participles. If a participle exists that is behaving as a verbal, then it will map to this bucket. Since the modifier bucket may have different levels of modification, it is possible to create a strength calculation of the modifiers based on level of modification to the object. In addition, it may be possible to have a variety of modifier buckets that perform a similar grammatical function within the language. It is possible to populate many modifier buckets based on the order of appearance and the presence of FWs as well as those items that appear in the predicate. Depending on how an implementation wants to use the modifier information, there may be one or more modifier buckets created for a single object set. Note that the modifier set or sets are bounded by the object set in most languages; meaning that if for instance a noun maps to an object bucket, then that noun does not map to the modifier bucket. Therefore, with the position of the object bucket known and other such data analyzed that indicates modification, the modifier bucket is populated 113 if required by an implementation.

Once the modifier bucket has been populated, other bucket types are possible based on the POS mappings for a specific language. There may be POS values that do not map specifically to a modifier or object bucket. In English, there are adverbs, interjections, interrogatives, and other such terms that may not fit into a modifier or object bucket for a given implementation. These then comprise the scan for other buckets function, when required by an implementation; an adverb bucket is the most common of these. This bucket may be known as the adverb bucket or miscellaneous bucket. For instance, when a system needs to create a summary of a document, the use of adverbs is required to fully understand the document enough to perform this task. In a question-and-answer (Q&A) system, an interrogative may need its own bucket so that they are easily identified and located within a sentence to determine the value of the input when a question is being determined within an input. After all such terms have been located, then each group is added to a bucket 115. There are as many groups as required for an implementation; a general-purpose system will require all terms to map to a bucket whereas a specific-purpose system may not. In general, depending on the implementation's purpose, a TU in the input, be it an FW or CW, will map to a specific bucket type as used by an implementation. As shown earlier, some implementations may only require the detection of terms that map to a specific bucket type, such as a verb. Some characters, such as punctuation that may be treated as a TU, may not map directly to a bucket, but are added to a bucket depending on which word they are located near, such as in the input "Mr. Ed", where the period would be added separately to the bucket containing "Mr". In implementations where such functionality needs to be analyzed, such as when abbreviations are being used as opposed to a called out form (as in "mister"), this may be mapped to a specific bucket type equal to a terminating point.

Once all the buckets have been built by mapping POS values as well as other characteristics of the TU, then the refinement process 116 can begin. It is possible that other information may change the terms in a bucket, either that a mapping based on POS value makes the bucket the incorrect size based on the analysis required, such as a modifier bucket that contains multiple occurrences of a noun. Each such noun may have characteristics that are important for analysis, such as the most common modifier of "ball" is the color "red". In another case, data from one bucket should be added to another bucket because it is actually treated as a cohesive unit; this occurs in English with the use of a compound noun, such as "dog house" or a proper noun, such as "John Smith". These types of changes can take many different forms: conjunctions, pronoun antecedents, sentence termination, among others.

Each of these forms, if present in the input, can be processed to determine if a bucket should be rechecked for membership. For instance, the conjunction generally requires that two elements of equal grammatical use or weight are combined together. By using the buckets, this information is readily available and allows the system to make a decision as to what the conjunction is combining, either in a positive or negative way. Depending on the number of conjunctions, these can be combined into a single bucket that has two parts. For instance, if a verb is linked to another verb via the conjunction, then the verb buckets can be combined to form a single bucket that has two parts.

Another refinement occurs when punctuation and other data is taken into account to separate list items, such as a list of adjectives for an object set. Thus, the modifier set may need to be broken down into the list parts to separate the modifiers or may be used as part of a weighting scheme whereby some characteristic or position of the modifier carries more weight than another one. Once they are separated, they can be broken up into different modifier sets if the weight to be applied to each element of the list is different; some implementations will not require this, so the modifier bucket does not need to be refined for this case and no processing needs to take place. Grouping punctuation may also limit a bucket, especially when it is used in relation to the point at which a sentence terminates.

Another common refinement is the location of the pronoun antecedent. The pronoun must meet certain requirements to see if it has a definite antecedent or an indefinite one. For instance, the pronoun "there" does not necessarily refer to a specific antecedent that is useful from an information retrieval or use perspective, so some implementations may not consider this as a refinement problem. In the case of personal pronouns, they are generally used, as the antecedent is in fact a substitution of a more concrete term than what has been used before. For many implementations, the pronoun and its antecedent location and value should be stored so that it is clear what antecedent refers to what pronoun. Other refinements are possible based on the use of grammar to locate the end of the sentence or the division of objects that appear together but actually represent different things within the confines of the modifier set. For instance, consider a date along with another name, such as "May 2001 Annual Report", where the date is considered a separate object from annual report. In this case, it is possible to create three buckets, where the first is the modifier bucket May 2001, the second is the modifier bucket "annual", and the third is the object bucket "report". This also is extremely useful in many search and retrieval problems, as well as other forms of analysis.

Once all the refinements have been made and the final bucket membership has been completed, then the buckets are organized into an object container structure 117. This is an optional step, as some uses may not require the relation between all buckets to be formed, whereby the bucket is sufficient to perform analysis on.

However, for most implementations, the organization into a sentence form with the object set as the dominant set will provide the most useful analytical basis for virtually any kind of language analysis at any level. This process is done by scanning for each object set, and locating its nearby sets, until another object set is found. Then, this is combined into a single structure known as the object container, analogous to the subject of the sentence that has other information related to it. To determine this, the object set will generally have its own modifier set associated with it, either through the use of FW independent status or through the use of sentence termination alignment done during the bucket formation. Modifier sets may also be divided between the predicate of one sentence and the modifiers of another term. The object containers can be arrayed for a single document so that they can be easily processed. The ordering of the object containers should be based on the tasks that need to be performed with the data; in some cases, sorting by the object set may be useful; in other cases, sorting by appearance order or the order of the input. All the grammar information is then compactly stored and can be accessed in any number of ways.

One use for the output is serve as input to a topical analyzer such as the embodiments described in U.S. application Ser. No. 12/192,846, entitled "SYSTEMS AND METHODS FOR TOPICAL SEARCHING", filed 15 Aug. 2008, the disclosure of which is hereby incorporated herein by reference in its entirety. Another use for the output is to serve as a format insensitive, natural language, collection of data, or analysis of data, which is particularly useful for aggregation or dissemination of social media data, e.g. twitter.

To better understand the example of FIG. 1, the following is an example of the operation of the process of FIG. 1 with the following input: "The dog went to the store." In this case, a general-purpose implementation is assumed. The input is received from the store 101. Then, the system parses the terms 102 based on the language rules, and the TUs that are formed are: {the} {dog} {went} {to} {the} {store} {.}. The appearance order is chosen as the linear order 103. The bucket formation is started 104, and the POS values for each CW 105 are as follows. "Dog" is a verb or a noun, "went" is a verb, and "store" is a noun or a verb. The verb formations 106 is scanned for first. Since both "dog" and "went" map to a verb, but do not form a pattern known in English. The determiner "the" in this implementation example is used to determine that dog is not being used as a verb. The same determiner function as used before rules out the use of {store} as a verb. The TU {went} is mapped to a verb bucket instance 107.

FW scanning 108 determines that {the} {to} are FWs. These are mapped to two different modifier bucket instances 109, whereby the first "the" maps to the first modifier bucket instance and the second phrase "to the" maps to the second modifier bucket. The object bucket scan 110 is performed next; and the noun "dog" is found to meet the requirements to map to the only object bucket instance 111 in this input. The modifier bucket is augmented 112 based on the presence of the preposition "to", and "store" is added to the second modifier bucket instance 113. The TU {.} has not been mapped to any bucket 114, but is added to the end of the second modifier bucket instance that contains "store" 115. In this example, no refinement process 116 following is required as all TUs have mapped to a bucket and no bucket contains multiple nouns, which is the condition this example implementation uses to require refinement analysis. In this case, the terminating point is being used as a full stop, so the entire input maps to an object container 117.

The output of the NLD can be used on its own or in a variety of tools that require handling of a natural language input. It would be possible to add the NLD to a web browser, whereby the NLD would handle a natural language input from the browser. The NLD can also be used on a mobile device, such as a cellphone, smartphone, tablet, etc., to handle natural language inputs such a texts, messaging, TWEETS, FACEBOOK, etc.

Embodiments described herein operate on or with any network attached storage (NAS), storage array network (SAN), blade server storage, rack server storage, jukebox storage, cloud, storage mechanism, flash storage, solid-state drive, magnetic disk, read only memory (ROM), random access memory (RAM), or any conceivable computing device including scanners, embedded devices, mobile, desktop, server, etc. Such devices may comprise one or more of: a computer, a laptop computer, a personal computer, a personal data assistant, a camera, a phone, a cell phone, mobile phone, a computer server, a media server, music player, a game box, a smart phone, a data storage device, measuring device, handheld scanner, a scanning device, a barcode reader, a POS device, digital assistant, desk phone, IP phone, solid-state memory device, tablet, and a memory card.

Note that any of the functions described herein may be implemented in hardware, software, and/or firmware, and/or any combination thereof. When implemented in software, the elements of the present invention are essentially the code segments to perform the necessary tasks. The program or code segments can be stored in a processor readable medium or a computer readable medium. The processor readable medium or computer readable medium may include any physical medium that can store or transfer information. Examples of physical media include an electronic circuit, a semiconductor memory device, a ROM, a flash memory, an erasable ROM (EROM), a floppy diskette, a compact disk CD-ROM, an optical disk, a hard disk, a fiber optic medium, etc. The code segments may be downloaded via computer networks such as the Internet, Intranet, etc.

Figure 2:
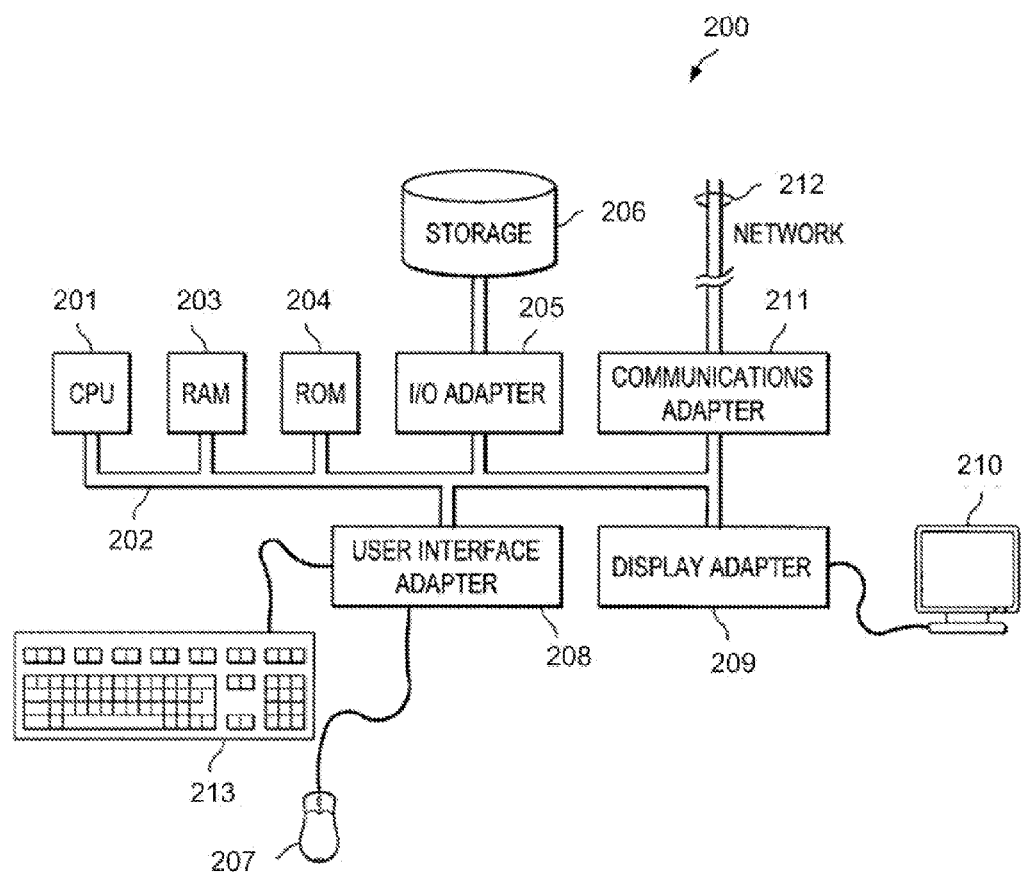
FIG. 2 depicts a block diagram of a computer system which is adapted to use the present invention.

FIG. 2 illustrates Computer System 200 adapted to use the present invention. Central Processing Unit (CPU) 201 is coupled to System Bus 202. The CPU 201 may be any general purpose CPU, such as an Intel Pentium processor. However, the present invention is not restricted by the architecture of CPU 201 as long as CPU 201 supports the inventive operations as described herein. Bus 202 if coupled to Random Access Memory (RAM) 203, which may be SRAM, DRAM, or SDRAM, etc. ROM 204 is also coupled to System Bus 202, which may be PROM, EPROM, or EEPROM, etc. RAM 203 and ROM 204 hold user and system data and programs as is well known in the art.

System Bus 202 is also coupled to input/output (I/O) Controller Card 205, Communications Adapter Card 211, User Interface Card 208, and Display Card 209. The I/O Adapter Card 205 connects to Storage Devices 206, such as one or more of a hard drive, a CD drive, a floppy disk drive, a tape drive, to the computer system. The I/O Adapter 205 is also connected to Printer (not shown), which would allow the system to print paper copies of information such as document, photographs, articles, etc. Note that the printer may be a printer (e.g. inkjet, laser, etc.), a fax machine, or a copier machine. Communications Card 211 is adapted to couple the Computer System 200 to a Network 212, which may be one or more of a telephone network, a local (LAN) and/or a wide-area (WAN) network, an Ethernet network, and/or the Internet network. User Interface Card 208 couples user input devices, such as Keyboard 213, Pointing Device 207, and Microphone (not shown), to the Computer System 200. User Interface Card 208 also provides sound output to a user via speaker(s) (not shown). The Display Card 209 is driven by CPU 201 to control the display on Display Device 210.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

What is claimed is:

1. A computer program product having a non-transitory computer readable medium having computer program logic recorded thereon for performing topical analysis for determining functionality of a device, where the computer program product comprising:
   code for receiving text data of a document in appearance order, wherein the appearance order is maintained;
   code for determining a linear order of the text based on the appearance order for grammatical analysis;
   code for forming a verb bucket, an object bucket, an adverb bucket, and a modifier bucket;
   code for parsing text data into term units, wherein term units comprise words and punctuation;
   code for scanning the term units for verbs, and placing each verb into the verb bucket;
   code for scanning the term units for modifier words, and placing each modifier word into the modifier bucket;
   code for scanning the term units for objects, and placing each object in the object bucket;
   code for scanning the remaining term units for adverbs and placing each adverb into the adverb bucket;
   code for refining the buckets, wherein refining includes moving at least one term unit from one of the buckets to another of the buckets to associate the one term unit with another term unit of the another bucket;
   code for assigning each bucket to an object container; and
   code for using the object container for identifying all functions of the device equal to a user manual for the device and displaying at least one function of the device equal to the user manual for the device.

2. The computer program product of claim 1, wherein the buckets comprise a plurality of bucket types; and
   wherein the plurality of bucket types comprise: a number type, a punctuation type, and a symbol type.

3. The computer program product of claim 1, wherein the computer program product is resident on a web browser.

4. A computer program product having a non-transitory computer readable medium having computer program logic recorded thereon for determining functionality of a device, the computer program product comprising:
   code for receiving text data of a document related to the device in appearance order, wherein the appearance order is maintained;
   code for determining a linear order of the text based on the appearance order for grammatical analysis;
   code for forming a verb bucket, an object bucket, an adverb bucket, and a modifier bucket;
   code for parsing text data into term units, wherein term units comprise words and punctuation;
   code for scanning the term units for verbs, and placing each verb into the verb bucket;
   code for scanning the term units for modifier words, and placing each modifier word into the modifier bucket;
   code for scanning the term units for objects, and placing each object in the object bucket;
   code for scanning the remaining term units for adverbs and placing each adverb into the adverb bucket;
   code for refining the buckets, wherein refining includes moving at least one term unit from one of the buckets to another of the buckets to associate the one term unit with another term unit of the another bucket;

code for assigning each bucket to an object container;

code for using the verb bucket of the object container for searching verbs, and using the verbs to determine the functionality of the device; and code for identifying all functions of the device equal to a user manual for the device and displaying a plurality of the functions of the device equal to the user manual of the device.

5. The computer program product of claim 4, wherein the computer program product is resident on a web browser.

\* \* \* \* \*